United States Patent [19]

Moriyama et al.

[11] Patent Number: 4,703,369
[45] Date of Patent: Oct. 27, 1987

[54] VIDEO FORMAT SIGNAL RECORDING AND REPRODUCING METHOD

[75] Inventors: Yoshiaki Moriyama; Sumio Hosaka, both of Saitama, Japan

[73] Assignee: Pioneer Electronic Corporation, Tokyo, Japan

[21] Appl. No.: 654,575

[22] Filed: Sep. 26, 1984

[30] Foreign Application Priority Data

Sep. 26, 1983 [JP] Japan .............................. 58-178642
Sep. 26, 1983 [JP] Japan .............................. 58-178643

[51] Int. Cl.⁴ .............................................. H04N 5/76
[52] U.S. Cl. .................................. 358/343; 360/19.1
[58] Field of Search ...................... 360/19.1, 32, 33.1, 360/48, 49, 72.2, 10.1, 10.2, 10.3, 11.1; 358/342, 343; 369/30, 32, 33

[56] References Cited

U.S. PATENT DOCUMENTS

| | | | |
|---|---|---|---|
| 3,859,458 | 1/1975 | Takezawa et al. | 358/147 |
| 3,991,265 | 11/1976 | Fukuda et al. | 360/19.1 |
| 4,227,213 | 10/1980 | Isobe | 358/343 |
| 4,305,131 | 12/1981 | Best | 358/342 |
| 4,347,527 | 8/1982 | Lainez | 360/10.1 |
| 4,446,488 | 5/1984 | Suzuki | 358/343 |
| 4,468,710 | 8/1984 | Hashimoto et al. | 360/19.1 |
| 4,583,132 | 4/1986 | Nakano et al. | 360/19.1 |
| 4,604,655 | 8/1986 | Moriyama | 358/343 |

Primary Examiner—Donald McElheny, Jr.
Attorney, Agent, or Firm—Sughrue, Mion, Zinn, Macpeak & Seas

[57] ABSTRACT

In a method for recording and reproducing a video format signal including audio data and a video data signal, the audio data is divided into groups of audio data, and identification codes for the groups of audio data are inserted into the video format signal as required. For reproducing the video format signal, a sound specifying instruction is compared with the identification codes to detect the group of audio data which has been specified so that the group of audio data thus detected is reproduced while the video data signal is reproduced, for instance, as a still picture.

16 Claims, 13 Drawing Figures

FIG. 6
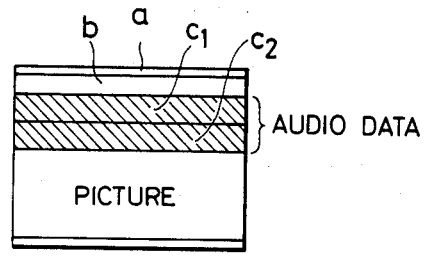
FIG. 7
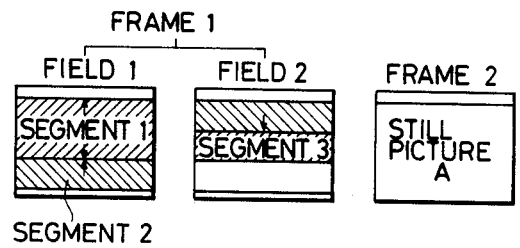
FIG. 8
| FIELD NUMBER | SEGMENT NUMBER | SUB-BLOCK NUMBER | SUB-BLOCK NUMBER |
|---|---|---|---|
| 1 | 1 | 2 | 0 |
|   |   |   | 1 |
|   | 2 | 2 | 2 |
|   |   |   | 3 |
| 2 | 3 | 1 | 4 |
|   |   |   |   |

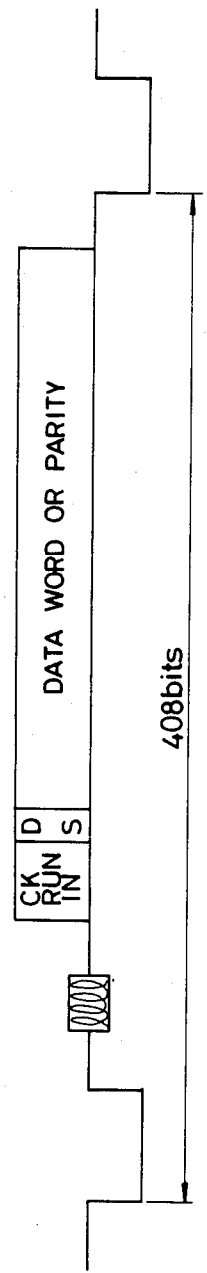
FIG. 9
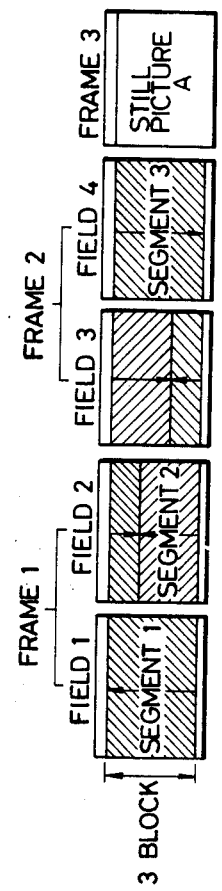
FIG. 12
FIG. 11

VIDEO FORMAT SIGNAL RECORDING AND REPRODUCING METHOD

BACKGROUND OF THE INVENTION

The present invention relates to a method for recording and reproducing a video format signal including audio frames having data such as time-axis-compressed audio data and video frames containing video information.

A so-called "SWS" (Still-With-Sound) system is known in which a video format signal including video information and time-axis-compressed audio information or audio data is recorded on a recording medium. Upon playback, the audio data obtained from the recording medium is subjected to time-axis expansion by a memory device or the like so as to be used as an audio accompaniment of still picture reproducing operation.

In the SWS system, the video format signal is obtained by the following process: An analog audio signal is converted into a digital signal by a modulation system having high compression effect such as an adaptive delta modulation (ADM) system. After being compressed, a redundant bit is added, which is an error correcting code, to complete every block of digital data. The digital signal thus processed is written in a time-axis-compressing buffer memory at a sampling frequency $f_1$. The content of the buffer memory is subsequently read out at a frequency $f_2$, which is higher than the frequency $f_1$, so that the audio data is time-axis compressed. The digital data and control data, consisting of a digital start code indicating a digital data insertion start position, a stop code for instructing a still picture reproducing operation, and a data count data indicating the amount of digital data, are inserted in the respective blocks. The video data may be inserted in the remaining blocks.

FIG. 1 shows a conventional device in which, after a data reading unit obtains time-axis-compressed data from the recording medium on which the video format signal formed as described above has been recorded, sound is provided for a still picture provided by the data reading unit.

In FIG. 1, a video format signal outputted by the data reading unit, namely, a video disk player (not shown), is applied through a video output terminal to an image reproducing circuit (not shown) and to a signal separating circuit 1. In the signal separating circuit 1, audio data consisting of digital data including audio information, control data, and a synchronizing signal is separated from the video format signal. The synchronizing signal thus separated is applied to a timing signal generating circuit 2. The audio data outputted by the signal separating circuit 3 is applied to a large capacity buffer memory 3. The control data outputted by the signal separating circuit 3 is applied to digital data start detecting circuit 4, a data count latch circuit 5 and a stop code detecting circuit 6. The digital data detecting circuit 4 operates to generate a pulse when it detects a digital data start code in the control data. The pulse thus generated is applied to the set terminal of a flip-flop 7. The flip-flop 7 operates in such manner that, when a pulse is applied to its set terminal, its Q output is raised to a logic level "1" and, when a pulse is applied to its reset terminal, the Q output is set to a logic level "0". Therefore, when the digital start code is detected, the Q output of the flip-flop 7 is raised to "1", which is applied as a write flag to one input terminal of an AND gate 9. The stop code detecting circuit 6 operates to generate a pulse when it detects a stop code from the control data. The output pulse of the stop code detecting circuit 6 is applied to the set terminal of a flip-flop 8. Accordingly, when the stop code is detected, similar to the case of the flip-flop 7, the Q output of the flip-flop 8 is raised to "1", and this bit is applied as a read flag to one input terminal of an AND gate 10. The data count latch circuit 5 stores the data count data included in the control data.

In writing data into the buffer memory 3 or in reading data out of the buffer memory 3, the output of an address counter 11 is applied to the address input terminal of the buffer memory 3 in order to specify storage positions therein. The address counter 11 is made up of a binary counter which performs a count-up operation in synchronization with the fall of a pulse applied to its clock input terminal and is placed in the initial state when "1" is applied to its clear input terminal. The output of the address counter 11 is further applied to one input port of a coincidence detecting circuit 12, to the other input port of which the output of the data count latch circuit 5 is applied. The coincidence detecting circuit subjects the output of the data count latch circuit 5 and the output of the address counter 11 to comparison and outputs a pulse when the two outputs coincide with each other. The output pulse of the coincidence detecting circuit 12 is applied to the reset terminal of the flip-flops 7 and 8. Accordingly, when the audio data separated by the signal separating circuit 1 has been completely supplied to the buffer memory 3, the Q output of the flip-flop 7 is set to "0", and when the audio data thus supplied has been completely read out of the buffer memory, the Q output of the flip-flop 8 is set to "0".

The timing signal generating circuit 2 applies two pulse signals having different repetition frequencies to the other input terminals of the AND gates 9 and 10, respectively. The timing signal generating circuit 2 is designed so as to produce the two pulses in response to each pulse of the synchronizing signal. When the Q output of the flip-flop 7 is at "1", i.e., when the write flag is on, one of the output pulses of the timing signal generating circuit 2 is applied as a write pulse $f_2(W)$ to the buffer memory 3 through the AND gate 9. When the Q output of the flip-flop 8 is at "1", i.e., when the read flag is on, the other output pulse of the timing signal generating circuit 2 is applied as a read pulse $f_1(R)$ to the buffer memory 3 through the AND gate 10. The repetition frequency of the write pulse $f_2(W)$ is higher than that of the read pulse $f_1(R)$ so that the audio information, time-axis compressed in the recording operation, is time-axis expanded, i.e., restored.

The write pulse $f_2(W)$ outputted by the AND gate 9 and the read pulse $f_1(R)$ outputted by the AND gate 10 are supplied to a NOR gate 13 where the inputted pulses are inverted. The output of the NOR gate 13 is connected to the clock input terminal of the address counter 11. Accordingly, in the case where the write pulse $f_2(W)$ is supplied to the buffer memory 3 and the latter is placed in the write mode, whenever audio data is written, the address counter 11 counts upwardly so that the specified storage position changes successively. In the case where the read pulse $f_1(R)$ is applied to the buffer memory 3 and the latter is placed in the read mode, whenever the data is read out, the address counter counts upwardly so that the specified storage position changes successively.

The output pulses of the digital data start detecting circuit 4 and the stop code detecting circuit 6 are applied through an OR gate 14 to the clear input terminal of the address counter 11 to set the address counter 11 to an initial value. Accordingly, when the digital start code is detected, the audio data is written in the buffer memory 3 in storage positions beginning with the storage position which corresponds to the initial value of the counter 11. When the stop code is detected, in the buffer memory 3, the audio data written in the previously designated storage positions is read out beginning with the storage position which corresponds to the initial value of the address counter 11.

The audio data read out of the buffer memory 3 is subjected to error correction in an error correcting circuit and then applied to a deinterleaver 16. The audio data is rearranged into the original data train by the deinterleaver 16 and then applied to a D/A converter 17. The D/A converter 17 is designed so that when the read pulse $f_1(R)$ is supplied to the clock input terminal thereof, input data is stored and thereafter a voltage corresponding to the input data outputted. The D/A converter 17 outputs an analog audio signal.

The output pulse of the stop code detecting circuit 6 is applied to a player control circuit 18, to which a play signal provided by a play switch (not shown) is also applied. The control circuit 18 controls a video disk player in such a manner that the latter performs a still picture reproducing operation when the stop code detecting circuit outputs a pulse, and it performs an ordinary motion picture reproducing operation when a play instruction signal is produced.

When the video disk player supplies the digital start code and the data count data prior to the audio data recorded over a plurality of frames $F_1$ as shown in FIG. 2, the flip-flop 7 is set so that the write flag is set and the content of the address counter 11 set to the initial value. At the same time, the data count data is stored in the data count latch circuit 5. The audio data is written in the buffer memory 3 in an amount specified by the data count data. Thereafter, when the stop code is supplied prior to the image information which has been recorded in the image frame $F_2$, a still picture reproducing operation is carried out. At the same time, the flip-flop 8 is set so that the read flag is turned on, whereupon the audio data written in the buffer memory 3 is read out. As a result, a still picture is reproduced with sound. After all the audio data has been read out of the buffer memory 3 and the reproduction of sound has been accomplished, the following still picture reproduction operation with sound is carried out by performing a suitable operation.

In the above-described video format signal recording and reproducing system, the image frame and the audio data are in the radio of 1 to 1. Therefore, when it is required to provide audio accompaniments in different languages, for instance, Japanese, English and French, for a single still picture, it is necessary to employ a video format signal in which, as shown in FIG. 3, an audio frame is provided for each of three identical still picture frames. In FIG. 3, the term "segment" will be used herein to indicate each of the different sound data groups corresponding to the audio accompaniments in Japanese, English and French.

In the video format signal thus formed, three still picture frames must be provided for the audio accompaniments in three different languages. Moreover, because the audio data for each still picture frame is different in length, the audio frames necessarily have useless parts.

SUMMARY OF THE INVENTION

Accordingly, an object of this invention is to provide a video format signal recording and reproducing method in which different audio data groups are provided for a single piece of video information with a highly efficient frame arrangement.

The foregoing objects and other objects of the invention are met by a video format signal recording and reproducing method wherein, for recording, data in the video format signal, which includes video information signal data and other data, is divided into groups and recorded on a recording medium together with identification codes indicating at least positions of the groups of data in the video format signal. For reproducing the video format signal, the groups of data included in the video format signal are read from the recording medium and stored in a memory. A sound specifying instruction is compared with the identification codes to detect the position of the groups of data in the memory specified by the sound specifying instruction. Only groups of data thus specified are read from the memory. The groups of data thus read are reproduced simultaneously with the reproduction of the video information signal.

The foregoing object and other objects as well as the characteristic features of the invention will become more apparent from the following detailed description and the appended claims when read in conjunction with the accompanying drawings.

BRIEF DESCRIPTION OF THE DRAWINGS

In the accompanying drawings:

FIGS. 5 and 6 are diagrams showing an example of the field arrangement of the video format signal according to the invention;

FIGS. 7 and 8 are diagram showing an example of the frame arrangement of the video format signal according to the invention;

FIG. 9 is a diagram showing an example of a part of the video format signal which corresponds to one horizontal scanning period (1H);

FIG. 10 is a block diagram showing a first example of a video format signal reproducing device according to the invention;

FIGS. 11 and 12 are diagram showing another example of the frame arrangement of the video formal signal according to the invention.

DESCRIPTION OF THE PREFERRED EMBODIMENTS

Figure 4:
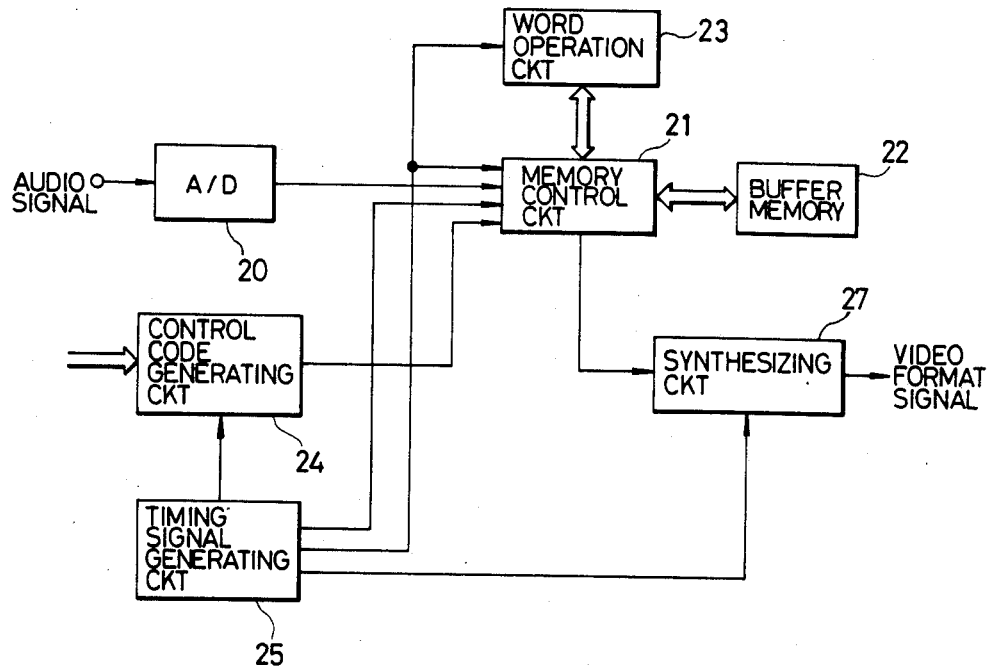
FIG. 4 is a block diagram showing a device for generating a video format signal according to this invention.

A video format signal generating device according to the invention is arranged as shown in FIG. 4. In the device, the input signal is an audio signal. The audio signal is converted into a digital signal by an A/D converter 20 employing an ADM system for instance. The audio data thus obtained is applied to a memory control circuit 21. The memory control circuit 21 supplies the audio data successively to a buffer memory 22 for storage therein, and reads the data out of the buffer memory 22 and supplies the data thus read to a check word operation circuit 23. The circuit 23 forms a check word according a predetermined code forming method and writes it at a suitable address in the buffer memory 22 in cooperation with the memory control circuit 21 so that a data array including the check word is formed in the buffer memory 22.

Further, a control code generating circuit 24 provides a control code including an identification code in response to a timing signal from a timing signal generating circuit 25 and supplies it to the memory control circuit 21. The memory control circuit 21 applies the control code to the buffer memory 22 so that the control code is stored at a predetermined address therein. The buffer memory 22 stores, for instance, audio data, cntrol data including identification data, and field sync codes for field clock synchronization or data synchronization.

The data thus stored is read out of the buffer memory 22 in a predetermined order and arranged in a onedimensional array. The data thus processed is applied to a synthesizing circuit 27 where it is combined with synchronizing signals such as horizontal and vertical synchronizing signals from the timing signal generating circuit, as a result of which a video format signal is generated. Thus, the video format signal, being selectively switched with video data (not shown), becomes a video format signal including the desired audio data and video data. The video format signal thus obtained is modulated as required and then recorded on a recording medium.

Figure 5:
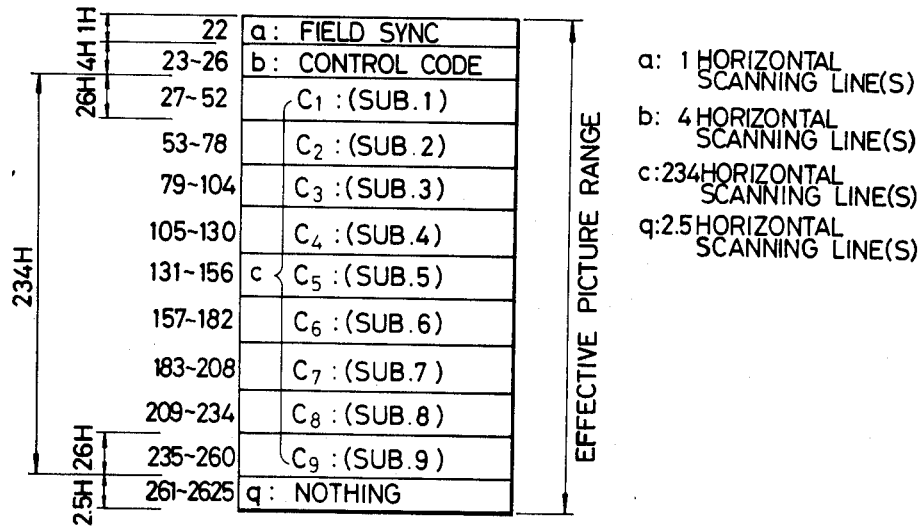

FIG. 5 shows an example of the signal arrangement in one field of the video format signal in the recording and reproducing system according to the invention. As is apparent from FIG. 5, in general, the effective picture range of one field is from 22H to 262.5H (H being the horizontal scanning period). The field sync signal is arranged in block a including 22H. The control code is arranged in block b including 23H to 26H. The audio data or video data is arranged in block c including 27H to 260H. The blocks a and b may be allocated so that they are out of the visible range. Nothing is assigned to block q. Each of the blocks other than block q has a size equal to an integer times H. Block c is divided into a number of subblocks $c_1$ to $c_x$ (x being 9 in this case).

In the video format signal thus formed, for instance, audio data may be arranged in the subblocks $c_1$ and $c_2$ and video data arranged in the remaining subblocks, as shown in FIG. 6.

If in recording the control code and the digital data in blocks b and c errors are concentrated by dropout or the like, interleaving is effected so as to prevent the continuous transmission of erroneous data and the addition of check words is carried out so that the errors are detected and corrected. However, the code arrangement including interleave and error correcting check words are completed individiually in the blocks b and c.

FIG. 7 shows an example of a signal arrangement which is especially suitable for the recording and reproducing system according to the invention. It has an audio frame (two fields) having only audio data in the block c and a still picture A frame having only video data in the block c. That is, one audio frame and one still picture A frame form a combination of a single still picture A and several kinds of audio accompaniments therefor. Audio data groups bearing the audio information of the different acoustic accompaniments are provided as segments which are numbered. The amount of data in each segment is represented by the number of sunblocks in the block c. The segment number and the number of subblocks form the above-described identification code, which together with the control code is inserted in the block b. Furthermore, a code for specifying an operation of writing all the recorded audio data into the buffer memory in the reproducing operation and an operation of writing only the audio data of a selected segment may be inserted as a part of the control code in the region b. As indicated in FIG. 7, for simplification in description, the block c consists of three subblocks. In the case of FIG. 7, the audio data groups correspond to three segments, and the amounts of data thereof are as indicated in FIG. 8.

FIG. 9 shows an example of digital data recorded on one horizontal scanning line. In this case, the data transfer rate is 408 $f_H$ ($f_H$ being the horizontal scanning frequency), and a clock run-in signal for clock synchronization is inserted before the digital data. A data synchronizing signal (several bits) for data synchronization is inserted in succession with the clock synchronizing signal. Data or an error correcting check word is inserted in succession with the data synchronizing signal.

FIG. 10 shows an example of a reproducing device employed in the video format signal recording and reproducing system according to the invention.

In FIG. 10, reference numeral 40 designates a read segment number specifying unit which, in response to an instruction from outside or inside, provides a number corresponding to the segment which is to be selectively read out of a large capacity buffer memory. The term "segment" as herein used is intended to mean a group of subblocks. The data writing and reading operations of the large capacity buffer memory are carried out for every segment.

Further in FIG. 10, reference numeral 41 designates a segment number decoder for decoding from the control code a segment number; 42, a number-of-blocks decoder for decoding from the control code a code indicating the number of blocks forming each segment; and 43, a read mode latch unit for decoding from the control code a code indicating a read mode and for setting a flag as to whether it is an ordinary read mode or a selective read mode. In the selective read mode, a block number generating unit 44 uses data indicative of the number of subblocks of each segment to obtain among the subblocks of a segment specified by the read segment specifying unit 40 the number of a subblock which is to be firstly read out of the buffer memory 36. The block number generating unit then applies the number thus obtained as a read start block number to a read start address generating unit 35. At the same time, the unit 44 applies the number of subblocks forming the specified segment to a comparison circuit 51. In the write or ordinary read mode, the block number generating unit 44 supplies the sum of the numbers of subblocks of all the segments to the comparison circuit 51. The read start address generating unit 45 generates an address in the buffer memory in correspondence to the read start block number outputted by the block number generating unit 44. An address counter 46 counts upwardly in response to the output of a counter clock 47. The address counter 46 operates to apply the address to the buffer memory. Furthermore, the address counter is reset by the output of an OR gate 55 when necessary, or loads the output content of the read start address generating unit 45 with the aid of the output pulse from an AND gate 54.

The counter clock 47 generates a counter clock pulse to cause the address counter to count upwardly. A block counter 48 counts every subblock period when audio data is written into or read out of the buffer memory, and it is reset by the output of an OR gate 56. The counter clock frequency is switched by the output of a system control circuit 50. A control data buffer memory 49 operates to decode codes other than the control codes which are decoded by the circuits 41, 42 and 43 and to temporarily store them.

The system control circuit 50 applies control signals to various parts in the system when necessary according to the codes decoded by the control data buffer memory 49. Furthermore, the circuit 50 supplies a pulse to the gates 55 and 56 at the start of writing digital data in the memory, and applies a pulse to the gates 53, 54 and 56 at the start of reading the data. Moreover, the circuit 50 outputs signal for specifying the reading operation and the writing operation for the large capacity buffer memory 36. The comparison circuit 51 outputs a pulse for resetting a set reset latch circuit 57 when the output of the block counter 48 coincides with the number of subblocks in the specified segment.

The output of the read mode latch unit 43 is applied through an inverter 52 to the gate 54. The output of the latch unit 43 and the output pulse of the system control circuit 50 are applied to the gate 53, the output of which is supplied to the gate 55. The output pulse of the system control circuit 50 and the output of the inverter 52 are applied to the gate 54, the output of which is applied to the load terminal of the address counter 46. The output pulse of the AND gate 53 and the output pulse of the system control circuit 50 are applied to the OR gate 55, the output of which is applied to the reset terminal of the address counter 46. Two output pulses of the system control circuit 50 provided respectively at the start of writing data and at the start of reading data are applied to the OR gate 56, the output of which is applied to the reset terminal of the block counter 48 and the set terminal of the set-reset latch circuit 57. That is, the set-reset latch circuit 57 is set by the output of the OR gate 56 and reset by the output of the comparison circuit 51. A play control circuit 59 outputs instructions for controlling the operation of the player according to output signals of the system control circuit 50.

When the above-described reproducing device is used to reproduce a video format signal formed according to the invention, the ordinary motion picture reproducing operation is carried out with the frame 1. In this operation, the digital data stored in the block c is successively stored in the large capacity buffer memory 36. Upon completion of the storage of the digital data in the buffer memory 36, the player reproduces the frame 2. In this operation, the player performs a still picture reproducing operation in which the digital data is outputted from the large capacity buffer memory 36. If the data is time-axis compressed audio data, the audio data is time-axis expanded into analog signals for use in the still picture reproducing operation.

The above-described operation will be described in more detail with reference to the operations of the various circuit elements.

The video format signal is applied to a TV synchronizing separator circuit 31 where horizontal and vertical synchronizing signals are separated therefrom and applied to a timing signal generating unit 32. The video format signal is further applied to a threshold circuit 32 with which a data reading optimum threshold level is determined in accordance with the peak level and pedestal level of data inserted in the video format signal. The output of the circuit 32 is applied as an NRZ (Non-Return-to-Zero) digital signal waveform with the determined level as a reference. The output signal is applied to a clock synchronizing signal separator circuit 33 with which a clock synchronizing signal is extracted. The clock synchronizing signal is applied to a system clock signal generating circuit 38 where a system clock signal in phase with the clock synchronizing signal is produced. The output of the threshold circuit 32 is applied to an S/P conversion circuit 34 where, with the aid of a signal from the timing signal generating circuit 39, the serial data is converted into eight-bit parallel data. The parallel data is applied to a switching circuit 35 where the parallel data is divided into control codes and audio data. The control codes are supplied to the circuits 41, 42, 43 and 49, while the audio data is applied to the buffer memory 36. According to the control codes from the switching circuit 35, the segment number decoder 41 and the number-of-blocks decoder 42 decode the numbers of segments for the audio data and the number of subblocks forming each segment and applies these numbers to the block number generating circuit 44. As a result, referring to the output of the read segment number specifying circuit 40, i.e., the number of a segment selectively read out of the the large capacity buffer memory 36, the block number generating circuit 44 applies the number of the top of the subblocks of the segment as a read start block number to the read start address generating circuit 45.

The control code is applied to the read mode latch unit 43 as described above. In the selective read mode, the unit 43 outputs a low logic level signal "L", which in the ordinary read mode, i.e., in the case of reading all the data out of the buffer memory beginning with the 0-th address, it outputs a high logic level signal "H". The control codes other than those which are decoded by the circuits 41, 42 and 43 are decoded by the control code buffer memory 49 and temporarily stored therein. According to the control codes thus decoded, the system control circuit 50 applies control signals to the various circuit elements in the system. When the S/P conversion circuit 34 outputs the top of audio data having several segments, the system control circuit 50 applies an "H" pulse as a write start signal to first input terminals of the gates 55 and 56. In this case, the gate 55 applies an "H" pulse to the reset input terminal of the address counter 46 so that the content of the latter is set to zero. At the same time, the content of the block counter 48 is also reset to zero by the output of the gate 56. The buffer memory 36 is placed in the write state by a control signal outputted by the system control circuit 50, and is placed in the operating state by the output Q of the latch circuit 57 which is set by the output of the gate 56. Accordingly, the audio data is stored at the addresses in the large capacity buffer memory 36, beginning with the 0-th address, in synchronization with the count advancement of the address counter. In this case, the block number generating circuit 44 has applied the sum of subblocks of all the segments to the comparison circuit 51, and the block counter 48 is incremented by a count of one whenever one subblock is written. When all the segments have been stored in the buffer memory 36, the two inputs to the comparison circuit 51 will coincide with each other, as a result of which the comparison circuit 51 outputs a pulse to reset the latch circuit 57 and the large capacity buffer memory 36 is placed in the nonoperating state by the output Q of the latch circuit 57 thus reset. In the writing operation of the buffer memory, the counter block pulse outputted by the counter clock 47 is converted into a high speed clock pulse signal in synchronization with the data of the video format signal by the system control circuit 50.

In this manner, all the segments are stored in the buffer memory.

When the reproducing operation is advanced to a predetermined frame, the player control circuit 59 applies a still picture reproducing instruction to the player in response to a control signal from the system control circuit 50 so that the player is placed in the still picture reproducing, state. When the audio data is read out of the large capacity buffer memory 36, the system control circuit 50 applies an "H" pulse as a read start signal to the gates 53, 54 and 56, and a control signal to the buffer memory so that the latter is placed in the read state. If, in this case, the output of the read mode latch unit 43 is an "L" indicating the selective read mode, the "H" pulse outputted by the AND gate 54 causes the address counter 46 to load the content indicated by the read start address generating circuit 45 while the "H" pulse outputted by the gate 56 resets the block counter 48. The output of the gate 56 resets the set reset latch circuit 57, the output of which enables the large capacity buffer memory 36. As a result, the audio data corresponding to the specified segments is successively read out of the buffer memory 36. When the content of the block counter, advancing from "0", coincides with the number of subblocks in the specified segments, the comparison circuit 51 outputs a pulse to reset the set reset latch circuit 57. The output Q of the circuit 57 thus reset disables the large capacity buffer memory 36. Thus, outputting of the audio data is accomplished.

When the output of the read mode latch unit is at "H" indicating the ordinary read mode, the read pulse outputted by the system control circuit 50 is applied through the gates 53 and 55 to the reset input terminal of the address counter so that the content of the address counter is zeroed, while the output pulse of the gate 56 resets the block counter 48 and sets the latch circuit 57. In this case, the states of the two inputs of the comparison circuit 51 are the same as those in the writing operation. Accordingly, all the audio data is read out of the large capacity buffer memor 36. In reading data out of the buffer memory 36, the counter clock pulse is converted into a slow speed clock pulse signal by the control signal from the system control circuit 50, which is in synchronization with the audio sampling rate.

The audio data read out of the buffer memory 36 as described above is subjected to error correction by an error correcting circuit 57 when necessary and deinterleaved so as to be rearranged into timewise-continuous data. The data thus processed is converted into an output analog audio signal. When the sound reproducing operation has been accomplished, the player control circuit 59 outputs a motion picture reproducing instruction in response to the read completion signal from the system control circuit 50 so that the player is placed in the motion picture reproducing state.

Next, the reproduction of the video format signal shown in FIG. 7 will be described.

In the video format signal, the digital data region of one field is divided into three blocks $c_1$, $c_2$ and $c_3$. FIG. 8 shows this with segment numbers, the number of subblocks in each segment, and the subblock numbers. That is, three different contents are inserted as selectable audio accompaniments of a still picture A in the frame 1 immediately before the frame 2 containing the data of the still picture A. The segment 1 has two subblocks $c_1$ and $c_2$ of the field 1, the segment 2 has one subblock $c_3$ of the field 1 and one subblock $c_1$ of the field 2, and the segment 3 has one subblock $c_2$ of the field 2. In FIG. 8, the top subblock of the top segment is numbered "0", the second numbered "1", etc.

In reproducing the video format signal, all the digital data of the segments 1, 2 and 3 is written into the large capacity buffer memory 36. It is assumed that, when the player starts reproducing the still picture A, the read segment number specifying unit 40 has been set to "2", for instance. In this case, the block number generating circuit 44 applies the number of the top subblock of the segment 2 (or "2") as a read start block number to the rear start address generating circuit 45, and applies the number of subblocks included in the segment 2 to the comparison circuit 51. When the system control circuit 50 supplies an "H" pulse to the gates 53, 54 and 56 and the output of the read mode latch circuit 43 is at "L" indicating the selective read mode, the gate 54 applies an "H" pulse to the load input terminal of the address counter. At the same time, the gate 56 applies a reset signal to the block counter 48 to set the content of the latter to "0". At this time instant, the address at which the top of the audio data in the segment 2 has been stored is inputted to the large capacity buffer memory 36. As the address counter 46 counts upwardly in response to the counter clock 47, the audio data of the segment 2 is successively read. When the counting operation is further advanced until the content of the block counter 48 coincides with "2", which is the number of subblocks in the segment 2, i.e., when reading the audio data of the segment 2 out of the buffer memory 36 has been accomplished, the comparison circuit 51 supplies a read stop signal to the large capacity buffer memory 36. That is, while the still picture A of the frame 2 is being reproduced, the audio data of the segment 2 only is read out of the buffer memory 36 as described above and outputted as a sound signal through the error correcting unit 58 and the D/A converter 37. Thus, the content of the segment 2 is selectively outputted as an audio accompaniment to the still picture A.

Figure 12:
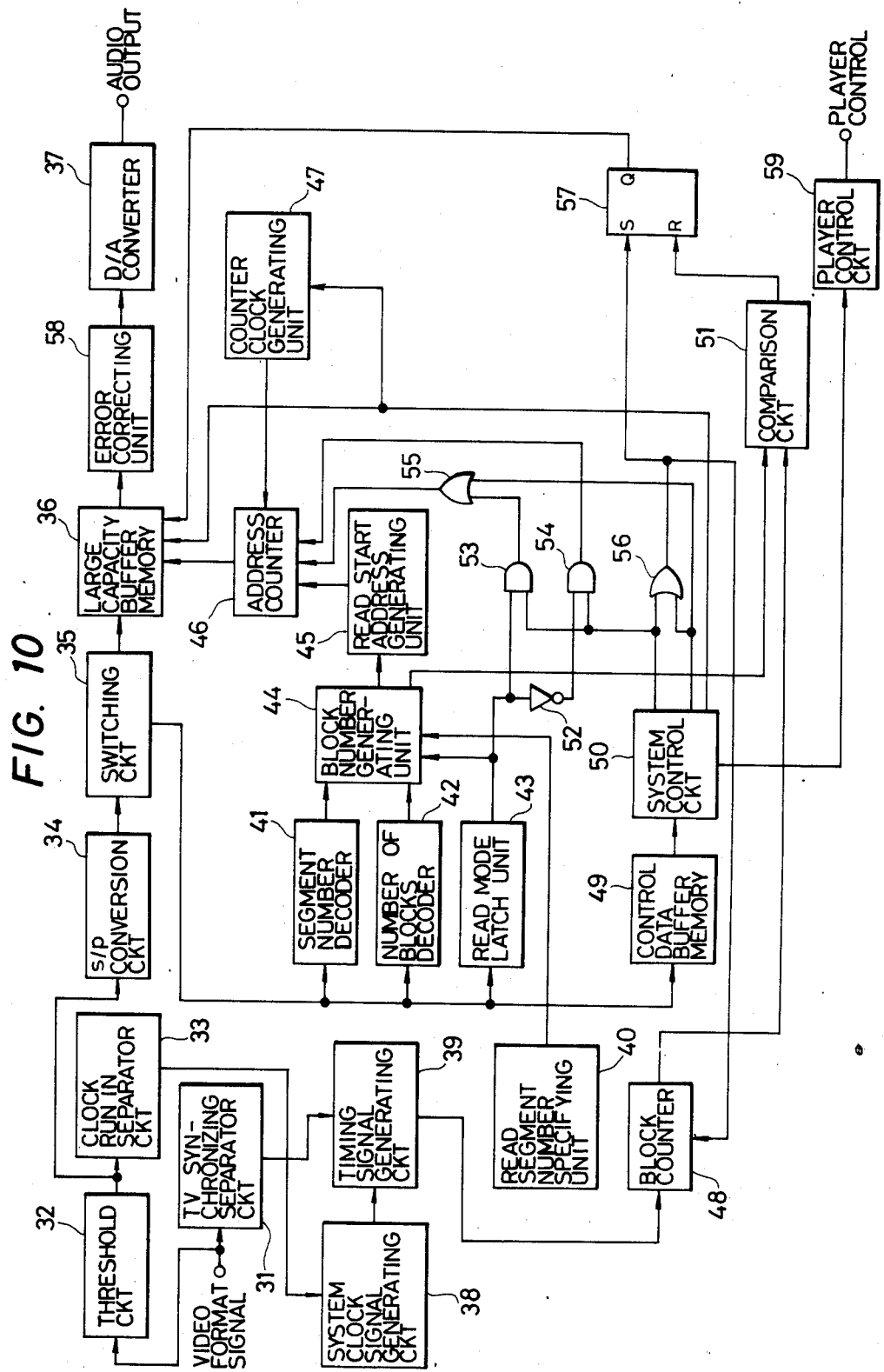

FIGS. 11 and 12 shows another example of the arrangement of a video format signal according to the invention, similar to the one shown in FIGS. 7 and 8. In this case, two frames are provided as audio data frames, and therefore a buffer memory for recording the audio data is necessarily larger in capacity. Thus, a video format signal reproducing device as shown in FIGS. 13 is provided according to the invention.

Figure 13:
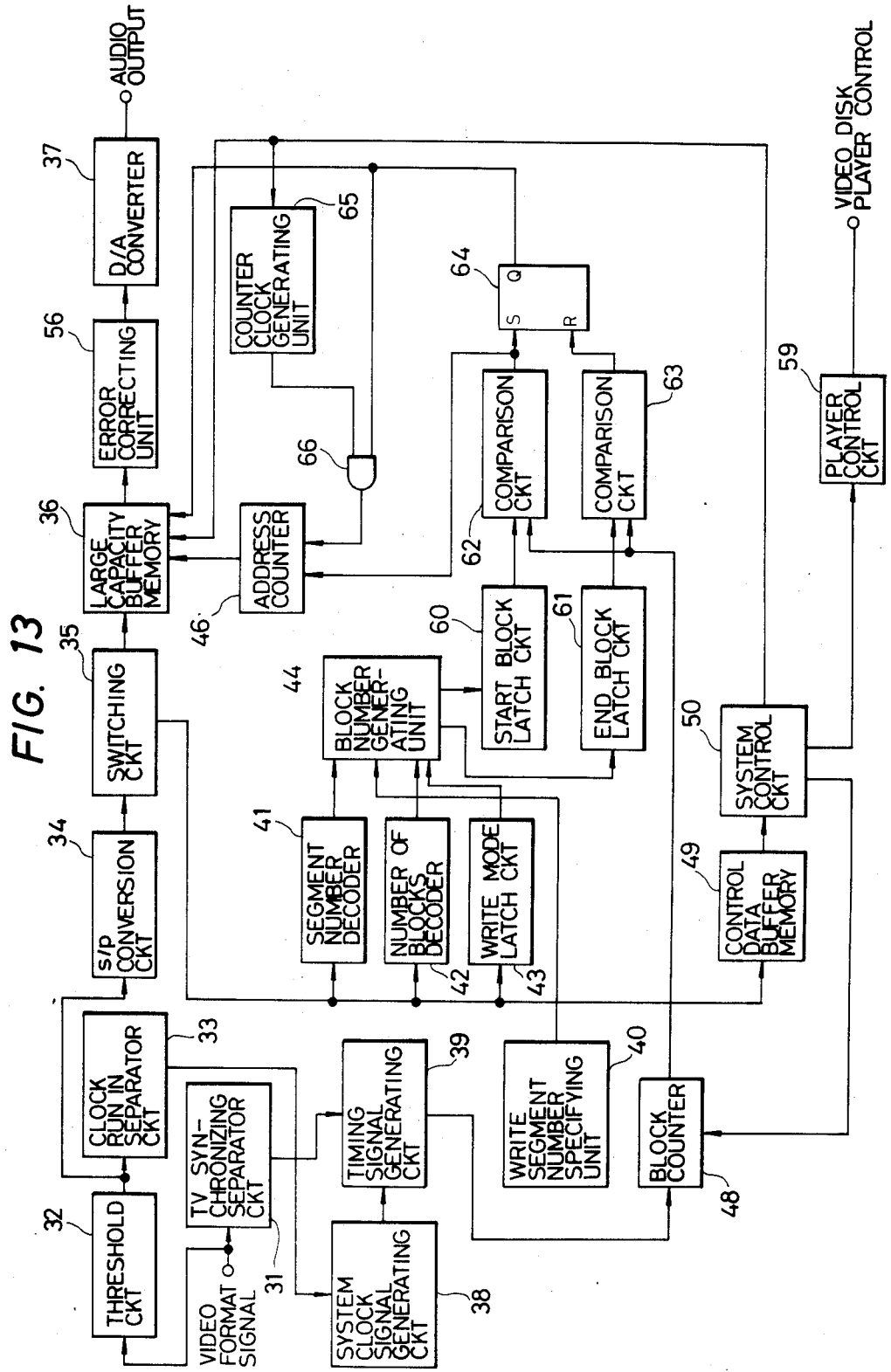
FIG. 13 is a block diagram showing a second example of the video format signal reproducing device of the invention.

The reproducing device shown in FIG. 13, including a start block latch circuit 60, an end block latch circuit 61, comparison circuits 62 and 63, a set reset latch circuit 64, a counter clock pulse generating circuit 65 and an AND gate 66, is similar to that shown in FIG. 10 except in the manner in which the address counter 46 is controlled and the fact that specified audio data is written in the buffer memory 36.

The operation of the reproducing device in FIG. 13 will be described; however, the description of the operations of the same parts as those of the reproducing device in FIG. 10 will be omitted.

The segment number decoder 41 and the number-of-blocks decoder 42 decode the control codes provided by the switching circuit 35 into the segment numbers of audio data and the number of subblocks forming each segment and supply them to the block number generating unit 44. If, in this case, the output of the write mode latch circuit 43 indicates a selective write mode, the with reference to the output of the segment number specifying unit 40, that is, to the number of a segment to be selectively written into the large capacity buffer memory 36, the number of the top subblock of the segment is outputted as a start block number, and the sum of this number and the number of subblocks of the selected segment is outputted as an end block number. The output of the block counter 48 represents the subblock order of the audio data outputted by the S/P conversion circuit 34 from the top of the data of the first segment. When that number coincides with the output of the start block latch circuit, the comparison circuit 62 outputs an "H" pulse. This "H" pulse sets the set reset latch circuit 64 so that its output Q is raised to "H". When the output Q of the circuit 64 is raised to "H", the counter clock pulse outputted by the counter clock pulse generating unit is supplied through the AND gate 66 to the address counter 46. At the same time, the output Q of the latch circuit 64 enables the buffer memory 36. The system control circuit 50 places the large capacity buffer memory 36 in the write state and makes the frequency of the output counter clock pulse of the counter clock pulse generating circuit synchronous with the data of the video format signal. As the initial value of the address counter 46 has been reset by the output pulse of the comparison circuit 62, the counter counts up from "0" and the audio data of the specified segment is stored at the addresses in the large capacity buffer memory 36 beginning with the 0-th address.

In succession, when the content of the output of the end block latch circuit, i.e., the subblock number at the end of the writing operation, coincides with the output of the block counter, the comparison circuit 63 outputs an "H" pulse to reset the set-reset latch circuit 64 so that the output Q thereof is set to "L". Accordingly, the output of the AND gate 66 is set to "L". As a result, the address counter is stopped and the large capacity buffer memory 36 disabled. Thus, the writing operation is ended. That is, only the audio data of the specified segment is stored in the buffer memory 3.

In the case where the output of the write mode latch circuit 43 indicates the ordinary write mode, the block number generating circuit 44 supplies the number "0" to the start block latch circuit 60 and the number of subblocks to be written to the end block latch circuit 61 so that the writing operation is performed similarly to the case of the selective write mode. When all the data has been written in this manner, the set reset latch circuit 64 is reset by the output of the comparison circuit 63. When the reproducing operation is advanced to a predetermined frame, the player control circuit 59 applies a still picture reproducing instruction to the player in response to the control signal from the system control circuit 50 so that the player is placed in a still picture reproducing state. In reading the audio data out of the buffer memory 36, the latter is placed in the read state by the output of the system control circuit, and the block number generating unit 44 applies the number "0" to the start block latch circuit 60 and the number of subblocks to be read to the end block latch circuit 61 so that, similarly to the case of the write mode, the output of the comparison circuit 62 is utilized to set the latch circuit 64 and to reset the address counter 46, and reading of the data is started beginning with the 0-th address of the address counter. In this case, the block counter 48 is reset by the system control circuit 50, and it is incremented by one count whenever one subblock is read. When the count value of the counter 48 reaches the content of the end block latch circuit 61, the comparison circuit 63 outputs an "H" pulse to reset the set reset latch circuit 64. Thus, the reading operation is accomplished.

The audio data thus read is subjected to error correction by the error correcting circuit when necessary and deinterleaved so as to be rearranged into timewise continuous data. The data thus obtained is applied as a sound output signal to the output terminal. Upon provision of the sound output signal, in response to the read completion signal from the system control circuit 50, the player control circuit 50 outputs a motion picture reproducing instruction. As a result, the player is placed in the motion picture reproducing state. In reading data out of the buffer memory 36, the counter clock pulse is converted into a slow speed clock pulse signal synchronous with the audio sampling rate by a control signal provided by the system control circuit 50.

In the case where the video format signal recorded according to the selective write system as shown in FIG. 11 is reproduced, before the frame 1 is reproduced, a desired segment number is specified and, for instance, the number "2" is set in the segment number specifying unit. When the player starts reproducing the frame 1, the control codes are decoded, as a result of which, utilizing the segment number and the number of subblocks of the segment, the block number generating unit outputs the start block number "4" and the end block number "8". At the same time, the block counter is reset to "0" by the system control circuit 50. As the reproducing operation advances, the block counter 48 counts up with the first subblock of the frame 1 as "0". When the number represented by the output of the block counter 48 coincides with the number represented by the output of the start block latch circuit 60, i.e., when the output of the block counter 48 reaches the number "4", the first subblock data of the segment 2 is provided at the output or the S/P converter 34 and the writing operation of the large capacity buffer memory 36 is started. When the content of the block counter 48 coincides with the content "8" of the end block latch circuit, the last data of the segment 2 has been provided at the output of the S/P converter 34. At the same time, the writing operation of the buffer memory 36 is suspended. Thus, while the frames 1 and 2 of the disk are reproduced, only the data of the segment 2 is stored in the buffer memory 36.

Furthermore, the frame 3 is reproduced as a still picture. In this case, the data of the large capacity buffer memory 36 is read and applied to the error correcting circuit 56 and the D/A converter circuit 37 so as to be output as an audio signal, whereby the content of the segment 2 is selectively reproduced as an audio accompaniment of the picture of the frame 3. For instance, if, in the case where the content of the segment number "2" is outputted for the still picture A, the segment number "2" is selected in advance, the reproducing device performs no operation while the player is reproducing the segment 1 but stores the data of the number of subblocks specified in the buffer memory after detecting the top of the segment 2. Upon completion of the storage operation, the reproducing device stops again, and at the time instant of the still pictures A the player reproduces the still picture and the audio data of the segment number "2" stored in the buffer memory 36 is outputted.

In the above-described embodiments of the invention, all the digital data in the region c is audio data selectively written into or read out of the buffer memory. However, the digital data may be replaced, for instance, by computer programs. This permits applications in which a plurality of programs for solving programs different in relative difficulty are provided for one still picture in an educational video system where one of the programs is selected according to the educational level of the user.

While the invention has been described with reference to a video disk recording and reproducing device, the technical concept of the invention can be equally applied to other devices such as a video tape recorder. Furthermore, the invention has been described with reference to an NTSC video signal. However, it is evident that the technical concept of the invention is applicable to other systems such as PAL.

Figure 1:
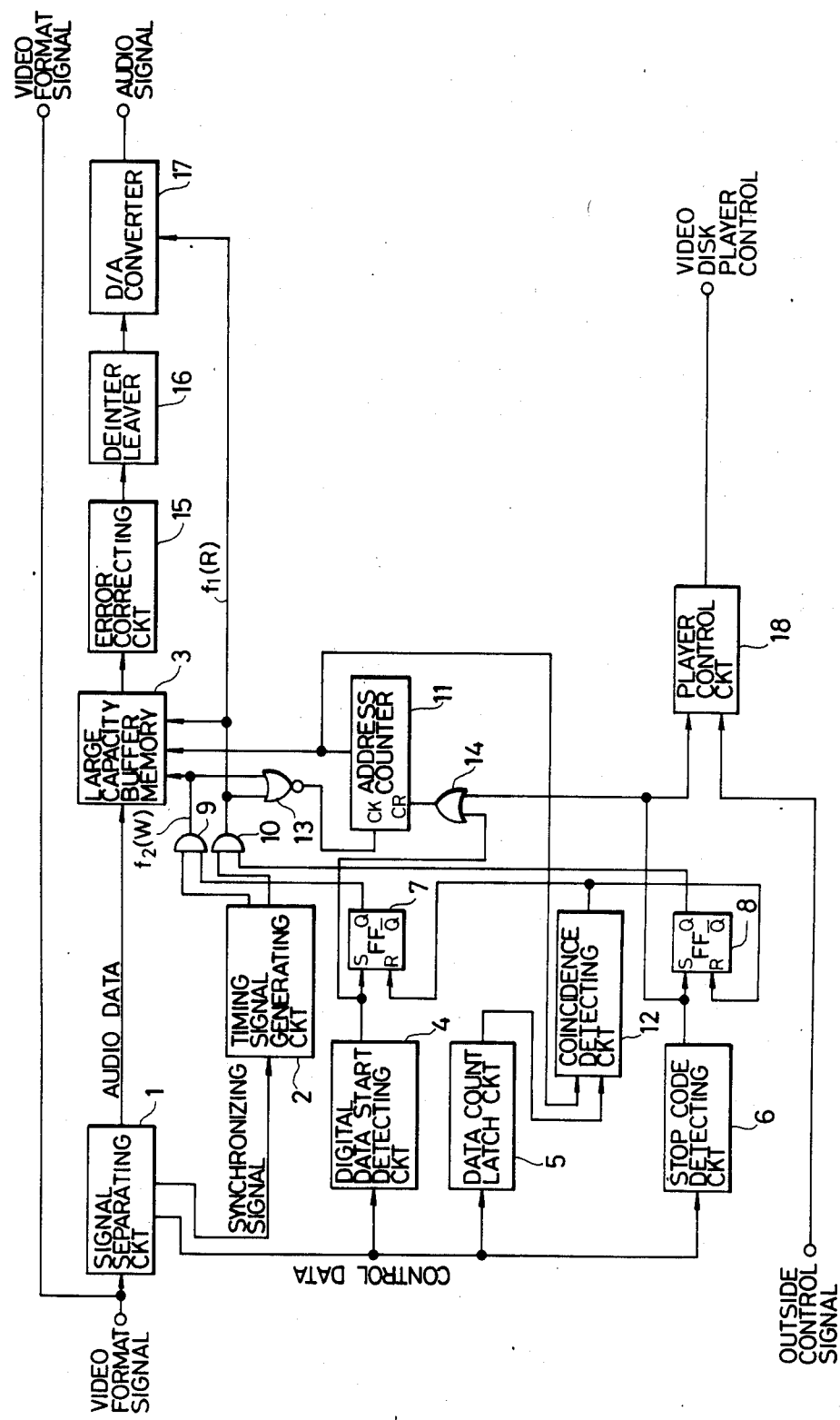
FIG. 1 is a block diagram showing a conventional video format signal reproducing device.
Figure 2:
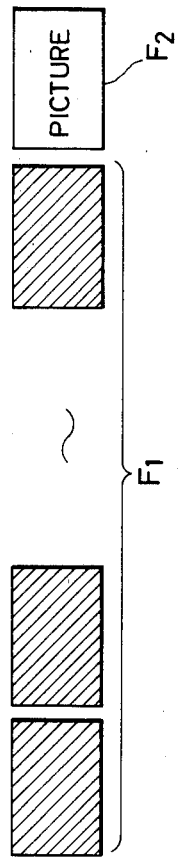
FIGS. 2 and 3 are diagrams showing frame arrangements.
Figure 3:
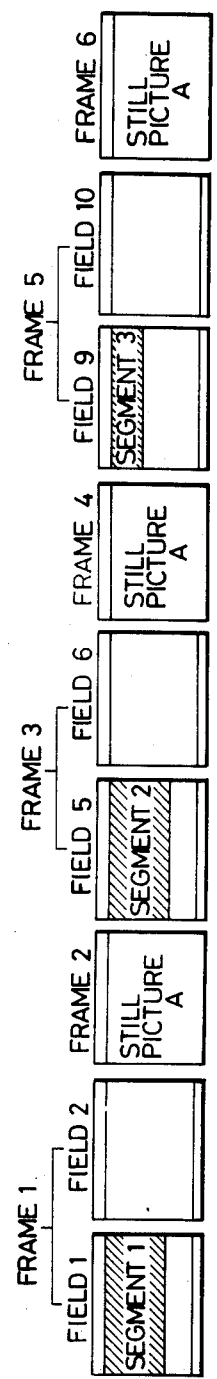

When, in the case where voices in different languages are outputted for one still picture, for example, voices in one of three languages are outputted, or the selection of the audio accompaniment is changed according to the educational level of the user, and it is required to reproduce a recording disk with which the operation of the buffer memory is in the ordinary read mode or ordinary write mode only, it is necessary to record several kinds of audio data in the frame which are provided immediately before the same respective still pictures as shown in FIG. 3. However, according to the selective read system or selective write system of the invention, several redundant frames for the still picture and the empty regions in the audio data frames can be eliminated. Thus, the recording medium, i.e., the disk, can be more efficiently utilized.

In the case where the buffer memory operates according to the conventional read system, in order to select the audio content is was necessary to retrieve the top frame of each of the segments including the audio data, and therefore it was necessary to apply a retrieve command to the player whenever required. On the other hand, in the selective read system of the invention, it is unnecessary to do so; i.e., a desired segment can be repeatedly read by a simple switching operation. In the case where the buffer memory operates according to the selective write system, it is impossible to repeatedly read a desired segment. However, in this case the buffer memory can be small in capacity when compared with that which operates according to the selective read system.

What is claimed is:

1. A video format signal recording and reproducing method for recording a video format signal including video information representing an image to be displayed and accompaniment data representing a plurality of accompaniments which may be reproduced with said image, said video format signal including a plurality of successive frames with each frame having plural lines and each line having a synchronizing signal portion followed by an information signal portion, said method comprising the steps of:

dividing said accompaniment data into a plurality of data groups with each group representing a different accompaniment;
generating a plurality of identification codes each different from the other and each containing information representing at least the position of a respective one of said data groups within said video format signal;
recording said identification codes with said data groups and video information on a recording medium in the information signal portions of said video format signal;
reading said video format signal from said recording medium;
storing said accompaniment data in a memory;
generating an accompaniment specifying signal representing a particular one of said different accompaniments to be reproducing with said image;
determining, in accordance with said accompaniment specifying signal and said identification codes, the location of a particular one of said data groups corresponding to said particular accompaniment;
reading only said particular data group from said memory; and
simultaneously displaying said image while reproducing said particular accompaniment in accordance with the data read out of said memory.

2. A method as claimed in claim 1, wherein said accompaniments comprise a plurality of different audio accompaniments for said image.

3. A video format signal recording and reproducing method for recording a video format signal including video information representing an image to be displaced and accompaniment data representing a plurality of accompaniments which may be reproduced with said image, said video format signal including a plurality of successive frames with each frame having plural lines and each line having a synchronizing signal portion followed by an information signal portion, said method comprising the steps of:

dividing said accompaniment data into a plurality of data groups with each group representing a different accompaniment;
generating a plurality of identification codes each different from the other and each containing information representing at least the position of a respective one of said data groups within said video format signal;
recording said identification codes with said data groups and video information on a recording medium in the information signal portions of said video format signal;
reading said video format signal from said recording medium;
generating an accompaniment specifying signal representing a particular one of said different accompaniments to be reproduced with said image;
determining, in accordance with said accompaniment specifying signal and said identification codes contained in the video format signal read from said medium, the location in said video format signal of a particular one of said data groups corresponding to said particular accompaniment;
storing only said particular data group in a memory without storing the remainder of said data groups;
reading only said particular data group from said memory; and
simultaneously displaying said image while reproducing said particular accompaniment in accordance with the data read out of said memory.

4. A method as claimed in claim 3, wherein said accompaniments comprise a plurality of different audio accompaniments for said image.

5. A method for recording a video format signal including video information representing an image to be displayed and accompaniment data representing a plurality of accompaniments which may be reproduced with said image, said video format signal including a plurality of successive frames with each frame having plural lines and each line having a synchronizing signal portion followed by an information signal portion, said method comprising the steps of:
  dividing said accompaniment data into a plurality of data groups with each group representing a different accompaniment;
  generating a plurality of identification codes each different from the other and each containing information representing at least the position of a respective one of said data groups within said video format signal;
  recording said identification codes with said data groups and video information on a recording medium in the information signal portions of said video format signal.

6. The method as claimed in claim 5, wherein at least one frame of said video format signal includes both video information and at least one of said data groups.

7. The method as claimed in claim 5, wherein said video information is included in a frame of said video format signal which does not include any of said data groups.

8. The method as claimed in claim 5, in which said data groups are recorded successively, and said identification codes represent lengths of said data groups.

9. A method for recording and reproducing a video format signal including video information representing an image to be displayed and accompaniment data representing a plurality of accompaniments to be reproduced with said image, said video format signal including a plurality of successive frames with each frame having plural lines and each line having a synchronizing signal portion followed by an information signal portion, said method comprising the steps of:
  dividing said accompaniment data into a plurality of data groups with each group representing a different accompaniment;
  generating a plurality of identification codes each different from the other and each containing information representing at least the position of a respective one of said data groups within said video format signal;
  recording said identification codes with said data groups and video information on a recording medium in the information signal portions of said video format signal;
  generating a specifying signal representing a desired one of said accompaniments to be reproduced with said image; and
  simultaneously reproducing both said image and said desired accompaniment in accordance with said specifying signal and the identification codes included in said recorded video format signal.

10. The method as claimed in claim 9, wherein said video information is included in a frame of said video format signal which does not include any of said data groups.

11. The method as claimed in claim 9, wherein at least one frame of said video format signal includes both video information and at least one of said data groups.

12. The method as claimed in claim 9, in which said groups of data are successively recorded, and said idenfication codes represent lengths of said groups of data.

13. A video format signal recording and reproducing method for recording a video format signal including video information representing an image to be displayed and accompaniment data representing a plurality of accompaniments which may be reproduced with said image, said video format signal including a plurality of successive frames with each frame having plural lines and each line having a synchronizing signal portion followed by an information signal portion, said method comprising the steps of:
  dividing said accompaniment data into a plurality of data groups with each group representing a different accompaniment;
  generating identification codes indicating at least positions of respective ones of said data groups within said video format signal;
  recording said identification codes with said data groups and video information on a recording medium in the information signal portions of said video format signal, with at least one frame of said video format signal including portions of at least two of said plurality of groups;
  reading said video format signal from said recording medium;
  storing said accompaniment data in a memory;
  generating an accompaniment specifying signal representing a particular one of said different accompaniments to be reproduced with said image;
  determining, in accordance with said accompaniment specifying signal and said identification codes, the location of a particular one of said data groups corresponding to said particular accompaniment;
  reading only said particular data group from said memory; and
  simultaneously displaying said image while reproducing said particular accompaniment in accordance with the data read out of said memory.

14. A video format signal recording and reproducing method for recording a video format signal including video information representing an image to be displaced and accompaniment data representing a plurality of accompaniments which may be reproduced with said image, said video format signal including a plurality of successive frames with each frame having plural lines and each line having a synchronizing signal portion followed by an information signal portion, said method comprising the steps of:
  dividing said accompaniment data into a plurality of data groups with each group representing a different accompaniment;
  generating identification codes indicating at least positions of respective ones of said data groups within said video format signal;
  recording said identification codes with said data groups and video information on a recording medium in the information signal portions of said video format signal, with at least one frame of said video format signal including portions of at least two of said plurality of groups.
  reading said video format signal from said recording medium;
  generating an accompaniment specifying signal representing a particular one of said different accompaniments to be reproduced with said image;

determining, in accordance with said accompaniment specifying signal and said identification codes contained in the video format signal read from said medium, the location in said video format signal of a particular one of said data groups corresponding to said particular accompaniment:

storing only said particular data group in a memory without storing the remainder of said data groups;

reading only said particular data group from said memory; and simultaneously displaying said image while reproducing said particular accompaniment in accordance with the data read out of said memory.

15. A method for recording a video format signal including video information representing an image to be displayed and accompaniment data representing a plurality of accompaniments which may be reproduced with said image, said video format signal including a plurality of successive frames with each frame having plural lines and each line having a synchronizing signal portion followed by an information signal portion, said method comprising the steps of:

dividing said accompaniment data into a plurality of data groups with each group representing a different accompaniment;

generating identification codes indicating at least positions of respective ones of said data groups within said video format signal; and recording said identification codes with said data groups and video information on a recording medium in the information signal portions of said video format signal, with at least one frame of said video format signal including portions of at least two of said plurality of groups.

16. A method for recording and reproducing a video format signal including video information representing an image to be displayed and accompaniment data representing a plurality of accompaniments to be reproduced with said image, said video format signal including a plurality of successive frames with each frame having plural lines and each line having a synchronizing signal portion followed by an information signal portion, said method comprising the steps of:

dividing said accompaniment data into a plurality of data groups with each group representing a different accompaniment;

generating identification codes indicating at least positions of respective ones of said data groups within said video format signal;

recording said identification codes with said data groups and video information on a recording medium in the information signal portions of said video format signal, with at least one frame of said video format signal including portions of at least two of said plurality of groups;

generating a specifying signal representing a desired one of said accompaniments to be reproduced with said image; and simultaneously reproducing both said image and said desired accompaniment in accordance with said specifying signal and the identification codes included in said recorded video format signal.

* * * * *